United States Patent
Salter et al.

(10) Patent No.: US 9,613,549 B2
(45) Date of Patent: Apr. 4, 2017

(54) ILLUMINATING BADGE FOR A VEHICLE

(71) Applicant: Ford Global Technologies, LLC, Dearborn, MI (US)

(72) Inventors: Stuart C. Salter, White Lake, MI (US); Paul Kenneth Dellock, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 400 days.

(21) Appl. No.: 14/519,914

(22) Filed: Oct. 21, 2014

(65) Prior Publication Data

US 2015/0138809 A1 May 21, 2015

Related U.S. Application Data

(63) Continuation-in-part of application No. 14/086,442, filed on Nov. 21, 2013.

(51) Int. Cl.

| F21S 8/10 | (2006.01) |
|---|---|
| F21V 21/00 | (2006.01) |
| G09F 13/04 | (2006.01) |
| B60R 13/00 | (2006.01) |
| G09F 21/04 | (2006.01) |
| B60Q 1/50 | (2006.01) |
| G09F 13/22 | (2006.01) |

(52) U.S. Cl.
CPC .............. *G09F 13/04* (2013.01); *B60Q 1/50* (2013.01); *B60R 13/005* (2013.01); *G09F 21/048* (2013.01); *G09F 2013/044* (2013.01); *G09F 2013/222* (2013.01)

(58) Field of Classification Search
CPC ........ B60Q 1/50; B60R 13/005; F21S 10/023; G09F 13/04; G09F 21/04
USPC .......................... 362/487, 496, 509–510, 545
See application file for complete search history.

(56) References Cited

U.S. PATENT DOCUMENTS

| 5,709,453 A | 1/1998 | Krent et al. |
|---|---|---|
| 6,031,511 A | 2/2000 | DeLuca et al. |
| 6,117,362 A | 9/2000 | Yen et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |

(Continued)

FOREIGN PATENT DOCUMENTS

| CN | 201169230 Y | 12/2008 |
|---|---|---|
| CN | 101337492 A | 1/2009 |

(Continued)

*Primary Examiner* — Jason Moon Han
(74) *Attorney, Agent, or Firm* — Jason Rogers; Price Heneveld LLP

(57) ABSTRACT

A badge mounted on a vehicle is provided herein. The badge includes a housing having a viewable portion. A first and a second light source are disposed inside the housing and are each configured to direct light toward the viewable portion. The viewable portion is configured to luminesce in response to excitation by light emitted from the first light source. Light emitted from the second light source produces a sparkle on the viewable portion.

17 Claims, 4 Drawing Sheets

(56) References Cited

U.S. PATENT DOCUMENTS

| | | |
|---|---|---|
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2011/0051451 A1 | 3/2011 | Stempinski |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0256543 A1 | 10/2012 | Marcove et al. |
| 2012/0280528 A1 | 11/2012 | Dellock et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| DE | 202006019347 U1 | 4/2008 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20100138715 A | 12/2010 |
| WO | 2006047306 A1 | 5/2006 |
| WO | 2014068440 A1 | 5/2014 | ions of a photoluminescent structure 10 are shown, each
ILLUMINATING BADGE FOR A VEHICLE

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE," the entire disclosure of which is hereby incorporated herein by reference.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a badge mounted on a vehicle is provided. The badge includes a housing having a viewable portion. A first and a second light source are disposed inside the housing and are each configured to direct light toward the viewable portion. The viewable portion is configured to luminesce in response to excitation by light emitted from the first light source. Light emitted from the second light source produces a sparkle on the viewable portion.

According to another aspect of the present invention, a badge for a vehicle is provided. The badge includes a viewable portion and a first light source configured to emit light toward the viewable portion. A second light source is configured to pulse light toward the viewable portion. The viewable portion is configured to luminesce in response to excitation by light emitted from the first light source. Pulsed light emitted from the second light source produces a sparkle on the viewable portion.

According to another aspect of the present invention, a badge is provided. The badge includes a housing having a viewable portion. A first and a second light source are disposed inside the housing and are each configured to direct light toward the viewable portion. Portions of the viewable portion are configured to glow in a first color and sparkle in a second color that is visually distinct from the first color.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminating badge for a vehicle. The badge may advantageously employ one or more photoluminescent structures configured to convert light received from an associated light source and re-emit the light at a different wavelength typically found in the visible spectrum.

Figure 1A:
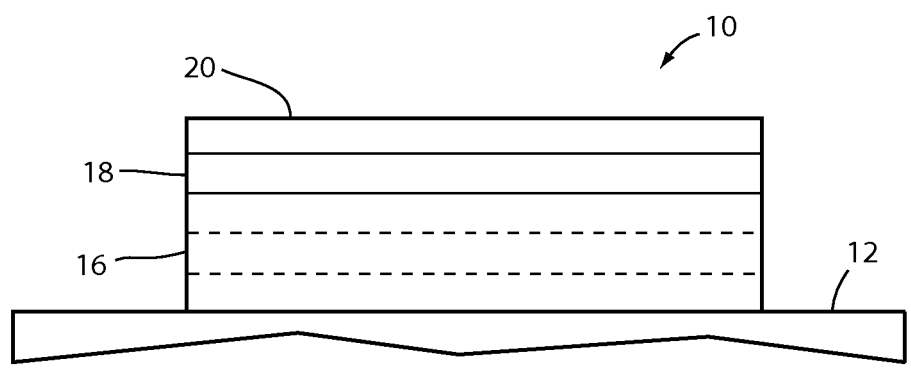
FIG. 1A illustrates a photoluminescent structure coupled to a substrate, according to one embodiment.
Figure 1B:
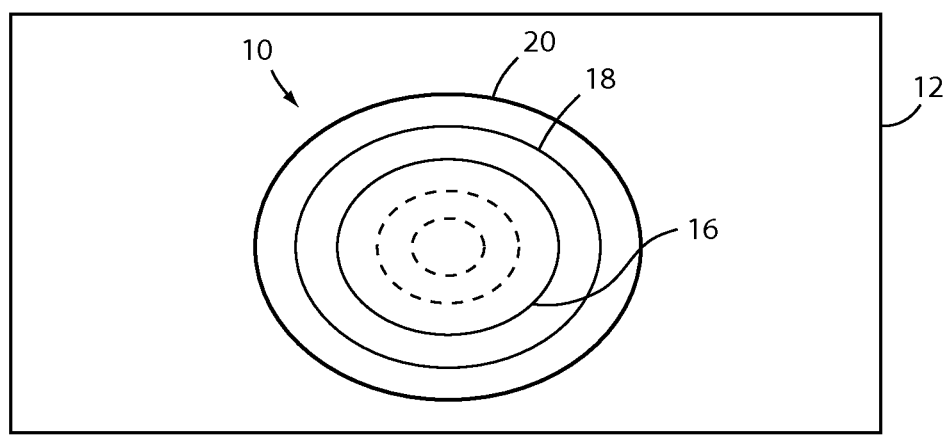
FIG. 1B illustrates a photoluminescent structure coupled to a substrate, according to another embodiment.
Figure 1C:
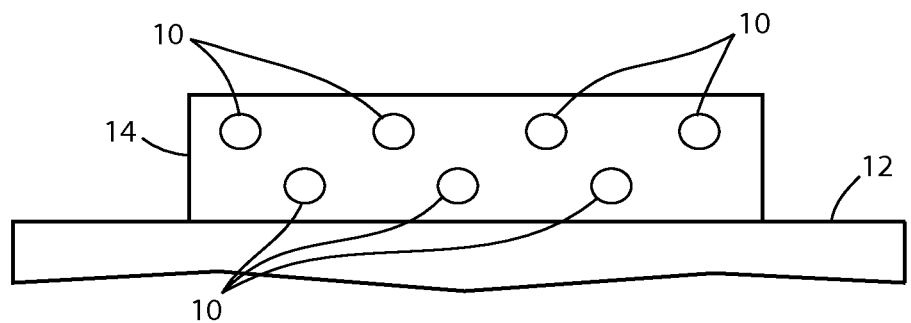
FIG. 1C illustrates a photoluminescent structure coupled to a substrate, according to yet another embodiment.

Referring to FIGS. 1A-1C, various exemplary embodiments of a photoluminescent structure 10 are shown, each capable of being coupled to a substrate 12, which may correspond to a vehicle fixture or vehicle related piece of equipment. In FIG. 1A, the photoluminescent structure 10 is generally shown rendered as a coating (e.g. a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g. a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials having energy converting elements with phosphorescent or fluorescent properties. Each photoluminescent material may become excited upon receiving light of a specific wavelength, thereby causing the light to undergo a conversion process. Under the principle of down conversion, the inputted light is converted into a longer wavelength light that is outputted from the photoluminescent structure 10. Conversely, under the principle of up conversion, the inputted light is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

In some embodiments, light that has been down converted or up converted may be used to excite other photoluminescent material(s) found in the energy conversion layer 16. The process of using converted light outputted from one photoluminescent material to excite another, and so on, is generally known as an energy cascade and may serve as an alternative for achieving various color expressions. With respect to either conversion principle, the difference in wavelength between the exciting light and the converted light is known as the Stokes shift and serves as the principle driving mechanism for an energy conversion process corresponding to a change in wavelength of light. In the various implementations discussed herein, each of the photoluminescent structures may operate under either conversion principle.

The energy conversion layer 16 may be prepared by dispersing the photoluminescent material in a polymer matrix to form a homogenous mixture using a variety of methods. Such methods may include preparing the energy conversion layer 16 from a formulation in a liquid carrier medium and coating the energy conversion layer 16 to a desired substrate. The energy conversion layer 16 may be applied to a substrate by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 18 to protect the photoluminescent material contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protection layer 20 optically coupled and adhered to the stability layer 18 or other layer (e.g. the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures is disclosed in U.S. Pat. No. 8,232, 533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Patent Publication No. 2014/0065442 A1 to Kingsley et al., entitled "PHOTOLUMINESCENT OBJECTS," filed Mar. 6, 2014; and U.S. Patent Publication No. 2014/0103258 A1 to Agrawal et al., entitled "CHROMIC LUMINESCENT COMPOSITIONS AND TEXTILES," filed Apr. 17, 2014, all of which are included herein by reference in their entirety.

Figure 2:
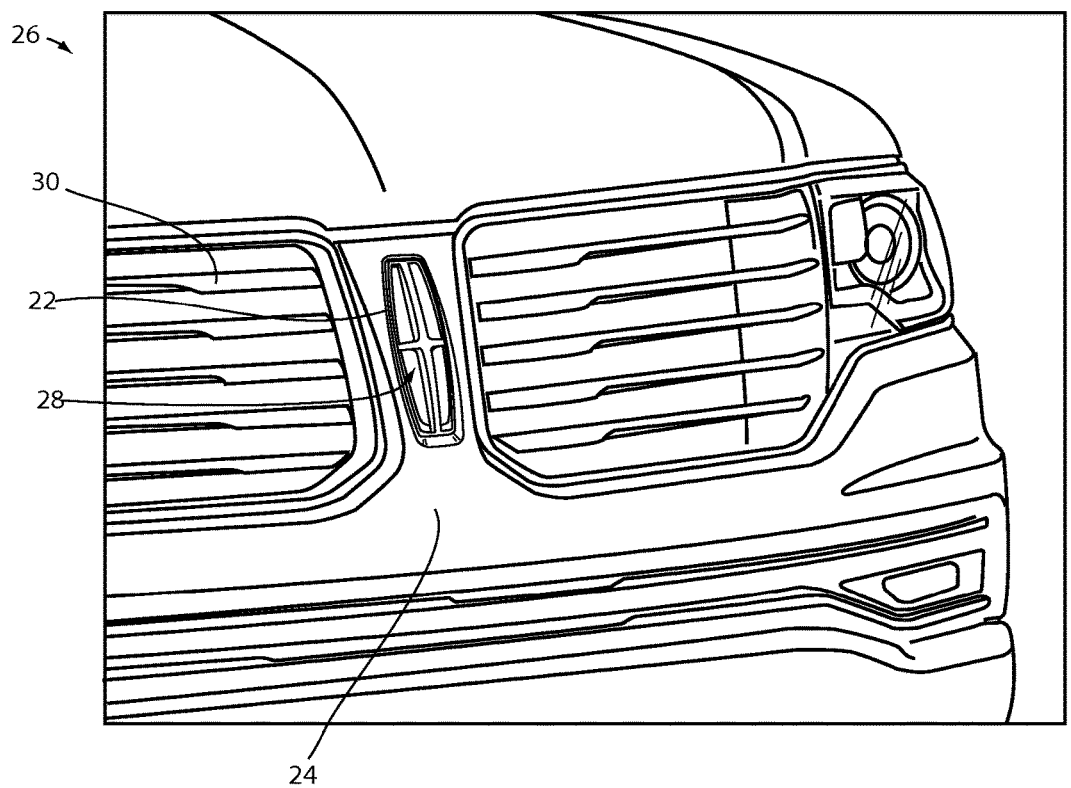
FIG. 2 illustrates a badge mounted to a front portion of a vehicle.

Referring to FIG. 2, a badge 22 is generally shown mounted on a front end 24 of a vehicle 26. In other embodiments, the badge 22 may be located elsewhere, such as, but not limited to, the rear end or side(s) of the vehicle 26. The badge 22 may be configured as an insignia that is presented as an identifying mark of a vehicle manufacturer and includes a viewable portion 28 that is generally prominently displayed on the vehicle 26. In the presently illustrated embodiment, the badge 22 is disposed proximate a grille assembly 30 in a central location of the front end 24, thus allowing the badge 22 to be readily viewed by an observer looking head on at the vehicle 26. As will be described below in greater detail, the badge 22 may illuminate and sparkle (i.e., shine brightly with flashes of light) to provide a distinct styling element to the vehicle 26.

Figure 3:
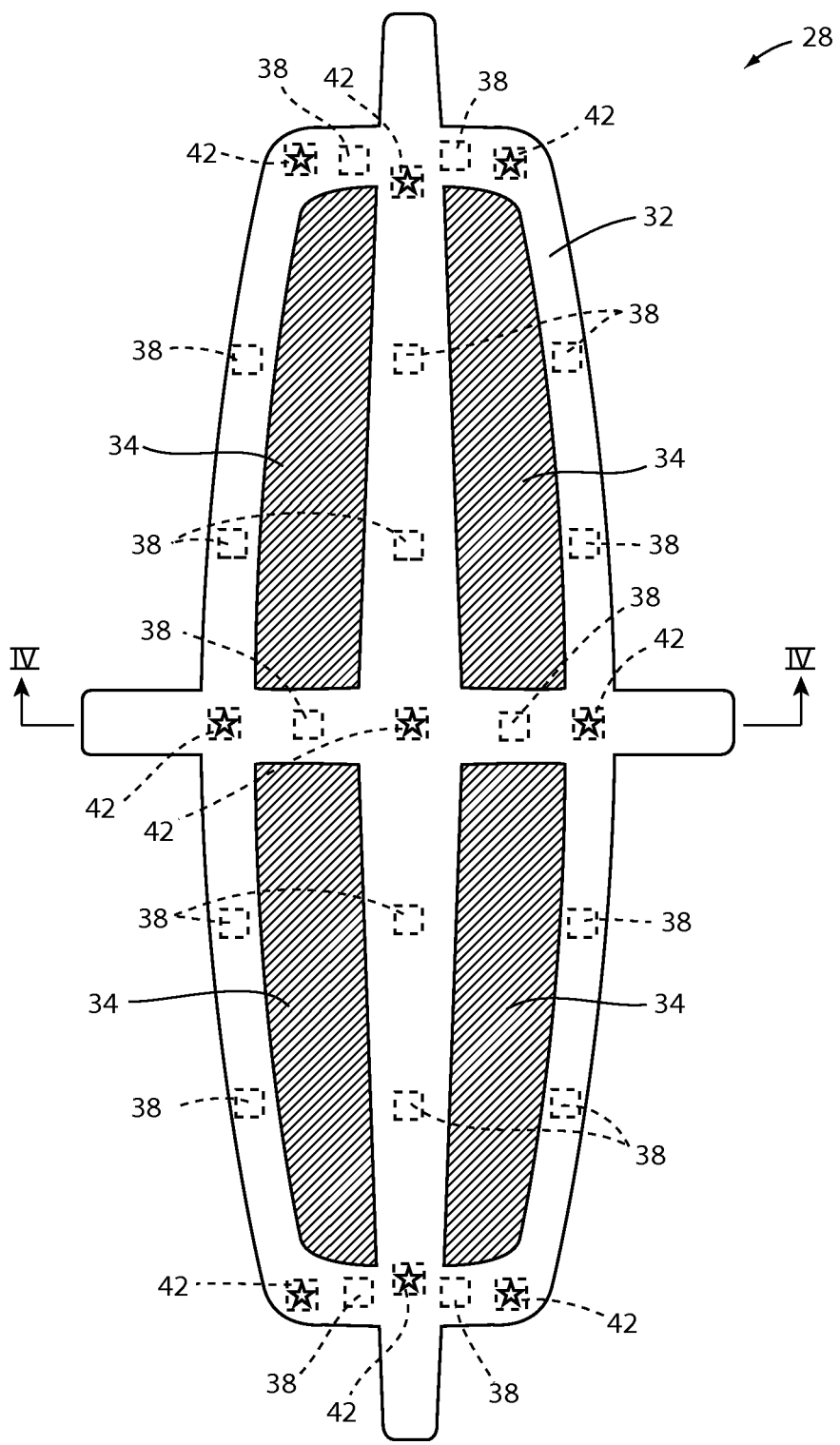
FIG. 3 is a front view of the badge according to one embodiment.

Referring to FIG. 3, the viewable portion 28 of the badge 22 is exemplarily shown according to one embodiment. The viewable portion 28 may include light permeable portion 32 and light non-permeable portions 34, which may be configured as opaque coatings applied to the viewable portion 28. In alternative embodiments, portions 34 may be left open to the front end 24 of the vehicle 26. The viewable portion 28 may also include a photoluminescent structure 36 (see FIG. 4) coupled to the underside of the viewable portion 28 and configured to luminesce in response to excitation by light emitted from one or more light sources 38 disposed inside the badge 22 and positioned below the photoluminescent structure 36. The light sources 38 may be configured as light emitting diodes (LEDs) emitting a wavelength of light that is characterized as ultraviolet light (~10-400 nanometers in wavelength), violet light (~380-450 nanometers in wavelength), or blue light (~450-495 nanometers in wavelength) to take advantage of the relative low cost attributable to those types of LEDs.

According to one embodiment, light emitted from light sources 38 is converted by the photoluminescent structure 36 into light of a longer wavelength and outputted therefrom. The converted light corresponds to a visible light, which includes the portion of the electromagnetic spectrum that can be detected by the human eye (~390-700 nanometers in wavelength) and may be expressed in a variety of colors defined by a single wavelength (e.g., red, green, blue)

or a mixture of multiple wavelengths (e.g., white). Thus, it should be understood that the photoluminescent structure 36 may be configured such that converted light outputted therefrom is capable of being expressed as unicolored or multicolored light. According to one embodiment, light sources 38 are configured to emit blue light and the photoluminescent structure 36 is configured to convert the blue light into a neutral white light having a color temperature of approximately 4000K to 5000K. The converted light escapes from the badge 22 via portion 32, thereby causing portion 32 to glow. To obtain a uniform illumination of portion 32, light sources 38 may be configured to emit non-focused light and are spaced accordingly inside the badge 22 to provide an even distribution of light for exciting the photoluminescent structure 36.

In addition to illuminating, portion 32 may be configured to sparkle at one or more locations, as is graphically illustrated in FIG. 3 by stars. The locations may be chosen to correspond to a corner or edge of portion 32. The sparkle effect at each location may be produced by light emitted from a corresponding light source 42 that is disposed inside the badge 22 and positioned below the photoluminescent structure 36 in relative proximity to the sparkle location. Each light source 42 may be operated to pulse light onto the corresponding sparkle location. According to one implementation, a pulse of light from a given light source 42 may last approximately ¹⁄₁₀ to ¹⁄₁₀₀ of a second and light sources 42 may be pulsed randomly or in a pattern. Additionally, a variable current may be supplied to each light source 42 to adjust the degree of illumination for each sparkle. For example the current may vary from 1 to 5 times the steady state current.

Light sources 42 may be configured as LEDs emitting a wavelength of light that does not excite the photoluminescent structure 36 and is instead transmitted through the photoluminescent structure 36 to directly illuminate the corresponding sparkle locations on portion 32. Alternatively, portions of the photoluminescent structure 36 located above light sources 42 may be cut out to allow light emitted from light sources 42 to directly illuminate the corresponding sparkle locations without having to pass through the photoluminescent structure 36. Light sources 42 may be chosen such that light emitted therefrom is relatively brighter than the luminescence exhibited by the photoluminescent structure 36 to allow the sparkles to be more apparent to onlookers. For instance, where the photoluminescent structure 36 luminesces in a neutral white color as in the embodiment described above, light sources 38 may be configured to emit cool white light having a color temperature of approximately 6000K to 6500K.

Figure 4:
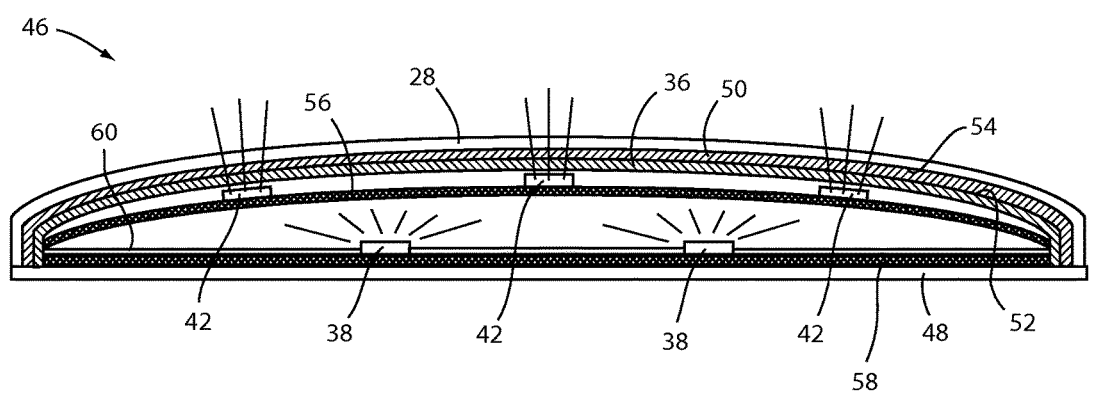
FIG. 4 is a cross-sectional view of the badge taken along lines IV-IV of FIG. 3.

Referring to FIG. 4, a cross-sectional view of the badge 22 is shown according to one embodiment. The badge 22 includes a housing 46 having the viewable portion 28 described above and a rear portion 48 that is capable of being secured to a vehicle. The viewable portion 28 may be arcuate whereas the rear portion 48 may be substantially linear. Each portion 28, 48 may be constructed from a rigid material such as, but not limited to, plastic and may be assembled together via sonic or laser welding. Alternatively, portions 28 and 48 may be assembled together via low-pressure insert molding.

With respect to the illustrated embodiment, the viewable portion 28 may be metalized to give the badge 22 a metallic outer appearance. For example, a metallic layer 50 may be applied to the underside of the viewable portion 28 via partial vacuum deposition. The metallic layer 50 should be light permeable to allow light to pass there through from an inner side 52 to an outer side 54. According to one embodiment, the photoluminescent structure 36 covers the metallic layer 50 and may be applied over the metallic layer 50 as a paint or other coating. In an alternative embodiment, the photoluminescent structure 42 may be molded or otherwise integrated into the viewable portion 28 of the housing 46.

Referring still to FIG. 4, light sources 42 may be provided on a flexible printed circuit board (PCB) 56 that is secured inside the housing 46 and positioned proximate to the viewable portion 28. Light sources 42 may each be positioned directly below the corresponding sparkle locations and pulse light toward the corresponding sparkle locations to produce brilliant flashes of light. Optionally, light sources 42 may include focusing optics to help concentrate light onto the corresponding sparkle locations. With respect to the illustrated embodiment, the PCB 56 should be substantially light permeable to allow light emitted from light sources 42 to be transmitted there through to excite the photoluminescent structure 36. As shown, light sources 38 may be positioned relatively further away from the viewable portion 28 to allow for a greater distribution of light toward the photoluminescent structure 36. For example, light sources 28 may be provided on a PCB 58 that is secured to the rear portion 48. The PCB 58 may include a white solder mask 60 to reflect light incident thereon.

According to one embodiment, the photoluminescent structure 36 is substantially Lambertian, that is, the apparent brightness of the photoluminescent structure 36 is substantially constant regardless of an observer's angle of view. As a consequence, converted light may be emitted outwardly from the photoluminescent structure 36 in numerous directions. With respect to the embodiment shown in FIG. 4, a portion of the converted light may be transmitted through the metallic layer 50 and outputted from portion 32 of the viewable portion 28. Another portion of the converted light may be emitted into the interior of the housing 46 and become incident on the white solder mask of the PCB 58. As a result, the converted light may be redirected back toward the photoluminescent structure 36 and transmitted there through before finally being outputted from the housing 46 via portion 32 of the viewable portion 28. This helps to ensure that the viewable portion 28 exhibits an optimal amount of luminescence. Furthermore, the provision of the white solder mask on PCB 58 also helps to ensure that an optimal amount of light emitted from light sources 42 reaches the photoluminescent structure 36. For example, it is possible for a portion of the light emitted from one or more of the light sources 42 to reflect off the photoluminescent structure 36, thereby resulting in decreased excitation of the photoluminescent structure 36. Thus, by providing a means to redirect the light back toward the photoluminescent structure 36, wayward propagating light originating from light sources 42 and contained inside the housing 46 is given another opportunity to excite the photoluminescent structure 36.

Accordingly an illuminating badge for a vehicle has been advantageously described herein. The badge provides various benefits including an efficient and cost-effective means to produce illumination that may function as a distinct styling element that increases the refinement of a vehicle.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A badge for a vehicle, comprising:
   a housing of the badge having a viewable portion; and
   a first and second light source disposed inside the housing and each configured to direct light toward the viewable portion;
   wherein the viewable portion is configured to luminesce in response to excitation by light emitted from the first light source; and
   wherein the second light source is disposed at a position in between the first light source and the viewable portion and is configured to pulse light in order to produce a sparkle at various locations on the viewable portion.

2. The badge of claim 1, wherein the second light source is disposed proximate at least one of an outer edge and a corner of the viewable portion.

3. The badge of claim 1, wherein the viewable portion includes a photoluminescent structure configured to perform an energy conversion on light emitted from the first light source.

4. The badge of claim 1, wherein the first light source is one of an ultraviolet LED, a violet LED, and a blue LED, and the second light source is a cool white LED.

5. The badge of claim 4, wherein the viewable portion luminesces in a neutral white color.

6. A badge for a vehicle, comprising:
   a viewable portion of the badge;
   a first light source configured to emit light toward the viewable portion; and
   a second light source configured to pulse light toward the viewable portion;
   wherein the viewable portion is configured to luminesce in response to excitation by light emitted from the first light source; and
   wherein pulsed light emitted from the second light source produces a sparkle on the viewable portion, and wherein the second light source is more proximately located to the viewable portion than the first light source.

7. The badge of claim 6, wherein the second light source is disposed proximate at least one of an outer edge and a corner of the viewable portion.

8. The badge of claim 6, wherein the viewable portion includes a photoluminescent structure configured to perform an energy conversion on light emitted from the first light source.

9. The badge of claim 6, wherein the first light source is one of an ultraviolet LED, a violet LED, and a blue LED, and the second light source is a cool white LED.

10. The badge of claim 9, wherein the viewable portion luminesces in a neutral white color.

11. The badge of claim 6, wherein each pulse of light from the second light source lasts $\frac{1}{10}$ to $\frac{1}{100}$ of a second.

12. A vehicle badge comprising:
    a vehicle badge housing having a viewable portion; and
    a first and second light source disposed inside the housing and configured to direct light toward the viewable portion, the second light source more proximately located to the viewable portion than the first light source; and
    wherein portions of the viewable portion are configured to luminesce in a first color and sparkle in a second color visually distinct from the first color.

13. The badge of claim 12, wherein the second light source is disposed proximate at least one of an outer edge and a corner of the viewable portion.

14. The badge of claim 12, wherein the viewable portion includes a photoluminescent structure configured to perform an energy conversion on light emitted from the first light source.

15. The badge of claim 12, wherein the first light source is one of an ultraviolet LED, a violet LED, and a blue LED, and the second light source is a cool white LED.

16. The badge of claim 15, wherein the viewable portion luminesces in a neutral white color.

17. The badge of claim 12, wherein each pulse of light from the second light source lasts $\frac{1}{10}$ to $\frac{1}{100}$ of a second.

* * * * *